(12) United States Patent
Heimer

(10) Patent No.: US 7,197,834 B2
(45) Date of Patent: Apr. 3, 2007

(54) VARIABLE TEST OBJECT AND HOLDER FOR VARIABLE TEST OBJECTS

(75) Inventor: Dietmar Heimer, Mainz (DE)

(73) Assignee: Metronom AG, Mainz (DE)

( * ) Notice: Subject to any disclaimer, the term of this patent is extended or adjusted under 35 U.S.C. 154(b) by 0 days.

(21) Appl. No.: 10/998,296

(22) Filed: Nov. 26, 2004

(65) Prior Publication Data
US 2005/0188775 A1 Sep. 1, 2005

(30) Foreign Application Priority Data
Dec. 3, 2003 (EP) .................................. 03027779

(51) Int. Cl.
*G01B 3/00* (2006.01)
*G01D 21/00* (2006.01)
(52) U.S. Cl. ............................ 33/502; 33/568; 73/1.79
(58) Field of Classification Search ................ 33/502, 33/573, 568; 73/1.79
See application file for complete search history.

(56) References Cited

U.S. PATENT DOCUMENTS 5,479,722 A  *  1/1996  Smith et al. .................. 33/617
5,829,151 A  *  11/1998 Collier et al. ................. 33/573
6,023,850 A       2/2000  Trapet
6,226,884 B1 *   5/2001  McMurtry .................... 33/557
6,298,572 B1 *  10/2001  McAuley ...................... 33/573
6,505,495 B1     1/2003  Blondeau
6,681,495 B2 *   1/2004  Masayuki et al. ............ 33/501
6,836,323 B2 * 12/2004  Schmadel ..................... 33/502
2003/0056566 A1 *  3/2003  Nashiki et al. ............... 73/1.79

FOREIGN PATENT DOCUMENTS

DE           19915012        10/2000

* cited by examiner

Primary Examiner—Christopher W. Fulton
(74) Attorney, Agent, or Firm—IP Strategies

(57) ABSTRACT

The invention relates to a holder for test objects, which are composed of at least two targets and at least one connecting element, comprising at least one carrier, at least one guide, which is arranged on or/and in the at least one carrier, and seats for the targets of at least one test object, wherein at least one seat can be moved along the at least one guide such that an adaptation of the position of the at least one movable seat to the position of one target of the test object is possible. Furthermore, the invention relates to a test object for the holder previously mentioned, comprising at least two targets and at least one connecting element, wherein the targets and connecting elements can be selected from a given set of single targets and single connecting elements and combined to form a test object.

20 Claims, 2 Drawing Sheets

VARIABLE TEST OBJECT AND HOLDER FOR VARIABLE TEST OBJECTS

FIELD OF THE INVENTION

The invention relates to a variable test object, which consists of at least two targets and a connecting element, and a holder for such variable test objects.

BACKGROUND OF THE INVENTION

For the monitoring of co-ordinate measurement machines and production devices, measurements on test objects are required which acquire the main deviations of the measurement machine or the production device. As mechanical comparative standards, such test objects represent an economical alternative to measuring comparative standards, such as for example interferometers. Although measurements with interferometers supply reliable information on the precision of the inspected machines, such a method in practice is very time consuming, so that the monitoring intervals are often chosen to be very long, e.g. annual. Modern machine tools and industrial robots operate in tight tolerance ranges and sometimes exhibit drift characteristics so that more frequent checking is necessary. With mechanical test objects additional inspections at shorter time intervals are possible also under economical viewpoints.

Depending on the field of application, various requirements are placed on test objects. In particular they should provide reliable measurement results within the scope of standard measurement conditions, i.e. at a temperature of $-20°$ C. to $+70°$ C. and a relative humidity of 0% to 100%, in order that they can be employed under various ambient conditions. Furthermore, the dimensions to be measured are sometimes very different. With large equipment to be measured they may extend into the range of some metres to over ten metres. Another viewpoint is the flexibility and the mobility of the test object which is why a large test object should preferably be able to be disassembled for transport and should be as light as possible, wherein however the accuracy of the measurements on the test object should be ensured.

A mechanical test object is described in DE 199 15 012 A1. It consists of four probe form elements and six connecting elements which are combined in a tetrahedral shape, so that the probe form elements are located at the corners of the tetrahedron. Each connecting element is located between two probe form elements. The materials of this test object are chosen such that a linear thermal expansion coefficient from probing point to probing point arises which is essentially equal to zero. Here, due to the design, the connecting elements are equally long in order to provide a self-supporting structure through the special shape of the tetrahedron, maintaining the probe form elements in well defined positions. This type of test object can be disassembled, the probe form elements are made of steel or glass ceramics and the connecting elements are of a light material, i.e. carbon-fibre reinforced plastic (CFRP), whereby good transportability is ensured. In one embodiment the releasable connections of the probe form elements to the connecting elements are based on magnetic forces.

The parts of the tetrahedron can however also be combined in that a number of connecting elements are arranged one behind the other, with in each case a probe form element between them and one at each of the two ends of the linear arrangement, forming a ball bar. Here, up to three additional probe form elements are optionally employed. The probe form elements may have various designs depending on the field of application, e.g. in the form of a ball or a different shape. Then probing points at intervals of integer multiples of the distance between two adjacent probe form elements are available, wherein the minimum distance is determined by the length of one of the connecting elements of the same length and the maximum length is six times the minimum distance.

To incorporate a ball bar thus formed into the measurement volume a holder is needed for reasons of stability and adjustment. According to the state of the art, this holder consists in this case of single seats onto which the probe form elements are placed, wherein however an adequate linear alignment of the ball bar must be achieved with low deviations in alignment.

The probing of the probe form elements occurs through tactile contact, i.e. they are for example probed with measuring styli through direct contact. However, amongst the state of the art are also elements measured by light. Generally, here a measurable element of a test object is designated a target. For measurements with tactile systems, chromium or stainless steel balls are, for example, used and the determination of the centre point of the ball occurs via a ball measurement. Also so-called reset targets can be measured by tactile systems, wherein the centre point of the ball is obtained using a cone in which a small ball with a defined diameter is placed so that the centre point of the target can be directly probed via a simple point measurement. If the probing is carried out using light, so-called retro-targets or theodolite targets are employed, for example, for measurements with photogrammetric and other optical systems. Finally, prisms can also be used for measurements with a laser tracker as target.

Other ball bars are also known from the state of the art, wherein the probe form elements are balls consisting of ceramic held on a carrier body at uniform distances by leaf-spring elements firmly joined to the carrier body. The exact distance between the balls is provided by distance tubes of steel which are clamped between the balls.

From the state of the art a holder for linear ball bars with fixed ball mountings at constant ball distances and the application of independent single seats is known.

Other known test objects, which cover two or three spatial dimensions, are designed in the form of a ball plate or ball cuboid, wherein the distances between the balls are permanently specified.

The test objects known from the state of the art have either the disadvantage of being inflexible due to the given ball distances or of being unusable due to a holder that is unsuitable for many purposes.

With the holder with fixed ball mountings it is disadvantageous that the distances of the balls are defined and constant due to the fixed position of the ball holders on the carrier body. Adaptation of the ball distances to the relevant measurement requirements is therefore not possible.

If the balls and bars are clamped, then stresses arise which can impair the measurement result, which is a disadvantage. Furthermore, a poorer temperature neutrality when using steel as the material for the distance tubes is also disadvantageous.

If a ball bar is placed on single seats, then adequate linear alignment of the ball bar must be ensured in order to achieve a low alignment error, which can only be obtained conditionally and with difficulty using seats which have to be adjusted independently of one another and which therefore is disadvantageous.

From the state of the art, as described above, only test objects are known which exhibit fixed distances between the targets. Here, the distances are already defined by the construction. In the case of ball bars with variable lengths of the connecting elements, such a construction is either unstable and therefore is not easily used or difficult to align and can only be positioned as required in the measurement volume with a great deal of adjustment.

Variable test objects, which cover one or more dimensions, and an associated stable holder for such test objects which can be arranged flexibly are not known from the state of the art. From the state of the art only one holder for linear ball bars with fixed ball mountings at constant ball distances or the use of independent single seats is known.

BRIEF SUMMARY OF THE INVENTION

In view of the disadvantages of the state of the art, the basis of the invention is the problem of providing a variable test object and an associated holder for variable test objects, which are matched such that such a variable test object can be held by the holder.

On one hand a variable test object should be provided which can be arranged flexibly, so that within the scope of a given set of targets and connecting elements, which at least partially facilitate different distances between the targets (in other words, which do not all necessarily give rise to the same target distances), various test objects can be combined and up to three dimensions acquired.

On the other hand a holder for variable test objects is to be provided, by which at least one such test object is held, whereby it should be possible to position test objects stable in the measurement volume with variably arranged distances between the targets. Furthermore, such a holder must ensure that the targets of the test object are adequately accessible for the measurements, irrespective of whether they are taken by tactile contact or with the aid of light.

The previously mentioned problem is solved by a test object according to the invention, with at least two targets and at least one connecting element, wherein the targets and connecting elements used for the test object can be selected from a given set of single targets and single connecting elements and can be combined to form test objects, and the targets and connecting elements are equipped such that they are held together by magnetic forces such that the test object is sufficiently stable to be held by the holder according to the invention, and that, due to a suitable choice of material of the targets and connecting elements, the thermally induced change in the distance between the targets of the test object is maintained within the scope of the measurement tolerances.

In addition, the invention comprises a holder for test objects, which are composed of at least two targets and at least one connecting element, with at least one carrier, at least one guide, which is arranged on or/and in the at least one carrier, and seats for the targets of at least one test object, wherein at least one seat can be moved along the at least one guide so that adaptation of the position of at least one movable seat to the position of a target of the test object is possible, wherein the test object can be held by the holder after the adaptation.

A test object according to the invention is characterised in that it is suitable for use in the holder according to the invention and facilitates variable target distances, whereby the holder according to the invention can be adapted to the relevant test object and at the same time facilitates a stable position and flexible usage of the test object.

Depending on requirements, such a test object according to the invention can realise different target distances, it can be adapted to the size of the measurement volume and also cover several dimensions. Furthermore, within the scope of the production tolerances, it has no linear thermal expansion under standard conditions and therefore maintains the chosen target distances. The at least partial use of CFRP material for the connecting elements also has the advantage of providing a light-weight and thus easy-to-use, easily transportable test object which can be securely held by the holder according to the invention.

A holder according to the invention is characterised in that it can hold a test object according to the invention. It has the advantage that at least one seat can be moved along the at least one guide such that an adaptation of the position of the at least one movable seat to the position of a target of the test object is possible, whereby at least one test object according to the invention is securely held. Consequently, simple fitting of the test object in the measurement volume is possible, while maintaining the test object stability and the target distances.

Furthermore, the holder according to the invention is characterised in that the carrier consists of a material, the linear thermal expansion coefficient $\alpha = \Delta L/L$ of which lies in the range from $\alpha = 0 \pm 20$ μm/° Cm, preferably $\alpha = 0 \pm 10$ μm/° Cm and most preferably $\alpha = 0 \pm 1$ μm/° C.m. Here, $\Delta L$ is the linear change in μm per ° C. of temperature change per length L in m.

Depending on requirements, more than one carrier can be used. For example, this may be necessary with a branching of the ball bar mentioned below. Furthermore, it may be necessary for one holder to hold more than one test object. For reasons of stability it may be advantageous to arrange the seats to be movable through more than one guide. If the targets are not just aligned along a straight line, as for example with a ball bar, then it is advantageous to arrange at least one further guide on or/and in the carrier, permitting a variable positioning of the seats in two or more parallel or/and different directions.

In the case of the ball bar which is formed from the tetrahedron constituents, according to the invention at least different lengths of the connecting elements can be partially used to arrange the target distances flexibly and consequently to obtain variable ball bars. If, for example, a set of n suitable different lengths of connecting elements and n+1 targets are available, then due to corresponding selection and combination of the connecting elements a total of $n+n \cdot (n+1)/2$ different target distances can be realised, whereas with a corresponding set containing the same length of connecting elements, there are only n different target distances. Taking as a numerical example six connecting elements and seven targets in the relevant sets, then 27 different target distances can be formed in the case of the variable lengths of the connecting elements. In the case of equally long connecting elements there are only six different target distances, as mentioned above.

Other possible variations for a test object on the basis of a ball bar exist according to the invention in that a general arrangement is selected, whereby, for example, using a further target and two further connecting elements a side branch to a linear ball bar can also be formed to cover a second dimension. With a further branch the third dimension can be covered. In this way with suitable lengths of connecting elements in the branches, it is possible, for example, to represent reproducibly well defined angles between the targets. Such branches are however unstable about the axis of the linear ball bar and must be appropriately held.

The connecting elements of a variable test object according to the invention need not be restricted to the connection of exactly two targets, but rather they can also connect together three or more targets. The possible variations of such a test object are based on the different positions of the targets, which are given by the individual connecting elements and on the different possible combinations of many connecting elements, which are coupled via the targets.

The previously mentioned holder can be developed further as described in the following.

In a preferred further development several or all supports are movable, whereby the positions of several targets become variable. Consequently for example, variable ball bars, which consist at least partially of bars of different length and of targets, can be composed and held such that the positions of the seats are adapted to the relevant positions of the targets.

In another further development at least one of the seats is fixedly joined to the carrier, wherein however at least one seat is movable. In this way a test object, for example which is composed of at least two targets and at least one selected connecting element, can be held in that at least one fixed seat accommodates one of the targets and at least one other seat is adapted by displacement to the position of the other target determined by the relevant connecting element. With this type of holder it is, for example, possible to hold variable ball bars so that at least one target has a fixed position with respect to the holder.

In another further development the material of which the at least one carrier consists has a linear thermal expansion coefficient $\alpha = \Delta L/L$ in the range of $\alpha = 0 \pm 20$ µm/° C.m, preferably $\alpha = 0 \pm 10$ µm/° C.m, most preferably $\alpha = 0$ µm/° C.m.

Another further development consists in that the material of the at least one carrier comprises CFRP material.

Through the use of this type of material in particular linear thermal expansion coefficients in the range of $\alpha = \Delta L/L = 0 \pm 0.1$ µm/° C.m can even be realised. This type of carrier has no linear thermal expansion in the range of standard conditions except within the scope of the manufacturing tolerances.

In another advantageous further development of the holder according to the invention, at least one support is arranged such that at least one target of a test object is held by magnetic forces. This has the advantage that the at least one target can be fitted onto the support quickly and easily and that it is securely held.

There is another further development in which at least one held test object is a ball bar and the holder ensures so little alignment error of the linear alignment of the target that the deviation of the distance of any two targets of a ball bar from the corresponding distance of the geometrically exact linear alignment is smaller than the calibration uncertainty $U = 1.5$ µm+1.5 µm·L/m, wherein L is the distance between two targets. The calibration uncertainty includes a constant and a length dependent component. The calibration uncertainty of a connecting element, which positions two targets at a distance of, for example, two metres from one another, accordingly is 4.5 µm. In this version a sufficiently good linear alignment of the targets is ensured so that the distances of any two targets of the ball bar are well known in accordance with the measurement requirements.

In another further development the at least one carrier consists of single elements and these single elements are held together by at least one releasable connection, such that reproducibility of the holder is ensured, in particular in that the accuracy of the distances of the targets of a held test object after each mounting of the holder is better than the calibration uncertainty 1.5 µm+1.5 µm·L/m. In this embodiment large holders can be disassembled for transport and be assembled again such that the measurements on the targets of the held test objects are reproducible.

A further advantageous further development is obtained if, due to suitable materials and suitable geometries of the constituent parts of the holder, the positions of the targets of a held test object vary at the most within the calibration uncertainty 1.5 µm+1.5 µm·L/m due to the physical ambient conditions varying within the scope of the standard measurement conditions or/and due to mechanical effects with proper use of the holder and its constituent parts.

Another advantageous further development is characterised in that the combination of the seats exhibits at least one degree of directional freedom, wherein the relevant degree of freedom points in the direction of the connecting line of the connected targets, so that the targets and the connecting elements are not subject to any stresses. This is, for example, facilitated by a combination of point and V-supports. Optionally, a flat seat can also be used. This type of arrangement is characterised in that a stress-free setting up of the test object can occur and that the test object is also held free of stress. If the first target, for example, is placed on a point seat and then the connecting element is coupled magnetically to the first target, then finally the second target can be brought on a V-seat and, free of force, coupled onto the other end of the connecting element. In this way it is furthermore possible to add further connecting elements and targets to build them up on the holder to form a larger test object, such as for example a ball bar. Stress-free branches on a ball bar can then be achieved with flat seats.

In another advantageous further development the holder comprises at least one mounting on which the holder can be mounted in the measurement volume. In particular these mountings, for example, can be suitable for fitting the holder on one or more tripods.

The various further developments can be used independently of one another or combined suitably with one another.

Further preferred embodiments of the invention are described in the following with reference to the drawings.

DETAILED DESCRIPTION OF THE INVENTION

Figure 1:
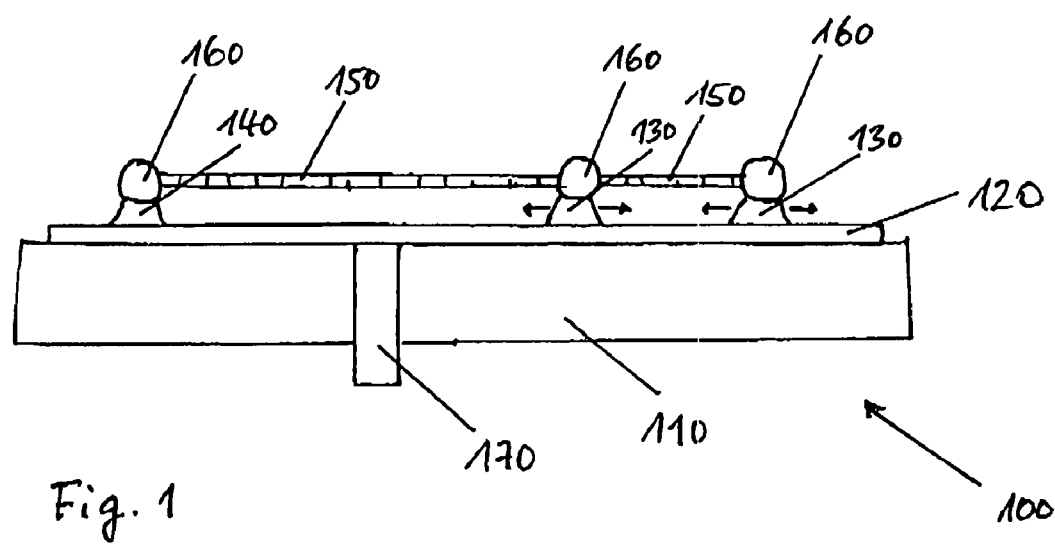
FIG. 1 shows a first embodiment of a test object according to the invention with a holder according to the invention.

FIG. 1 shows a test object according to the invention on a holder according to the invention. In this example the test object is a ball bar with two connecting elements 150 and three targets 160, which are held together releasably by magnetic forces. Here, the connecting elements and targets are selected from a given set in which at least two connecting elements of different length are provided, so that different target distances can be realised. The holder comprises a carrier 110, which can be disassembled into single elements which are held together by a releasable connection 170, as well as a guide 120 for the seats 130, 140 on which the targets are located. One seat 140 is fixedly fitted to the carrier so that the exact position of the target located on it is also known relative to the holder. Two seats 130 are movable, so that adaptation of the position of the seats to the lengths of the connecting elements and the distances and positions of the targets they define is possible. The carrier material comprises CFRP material.

This material was manufactured using Tennax UMS 252624K fibres and resin with the DIN designation L 160 as well as hardener with the DIN designation H 163. This resulted in a linear thermal expansion coefficient of $|\alpha| \leq 0.1$ µm/° C.m.

Figure 2:
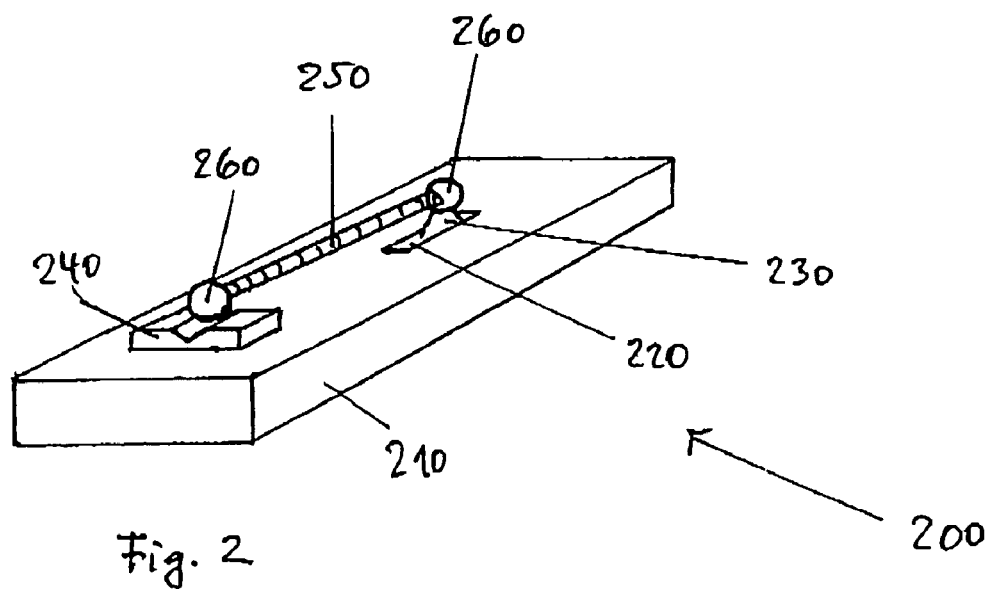
FIG. 2 shows a second embodiment of a test object according to the invention on a holder according to the invention with a special form of seat.

FIG. 2 illustrates an advantageous embodiment of the supports. Here, a target 260 of the test object rests on a point seat 230 and is thus stabilised in its position. A further target is located on a V-seat 240. A connecting element 250 is arranged between the two targets.

Such an arrangement is characterised in that a stress-free setup of the test object can occur and that the test object is held free of stress. If the first target is placed on the point support and then the connecting element is magnetically coupled to the first target, the second target on the V-seat can be brought up to and coupled to the other end of the connecting element. In this way it is furthermore possible to add further connecting elements and targets and to set up a larger test object on the holder.

Figure 3:
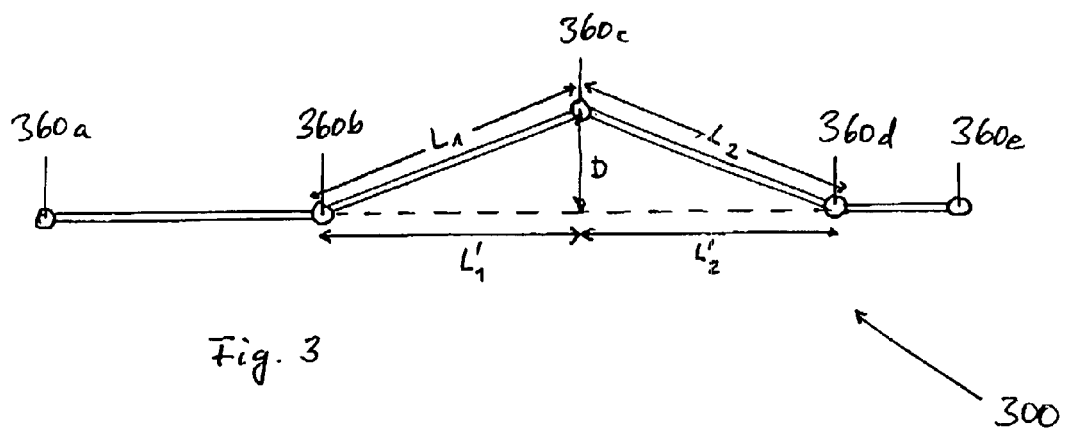
FIG. 3 illustrates the concept of alignment error in the linear alignment of a ball bar.

FIG. 3 illustrates the concept of alignment error in the linear alignment of a ball bar. Here as an example, at least an extract of a ball bar is illustrated in which the target 360c deviates slightly from the geometrically exact alignment. The perpendicular distance D of the target 360c to the alignment line is known as the alignment error. The question now has to be put of how large the alignment error D may be as a maximum so that the distance $L_1+L_2$ of the target 360b and the target 360d reduces to no more than the calibration uncertainty U on $L_1'+L_2'$, since U also determines the quality of the ball bar and the amount of the change of distance should therefore not be greater than U. The greatest change occurs when the distance of target 360b to target 360c and the distance of target 360c to target 360d are equal. Assuming that this distance is in each case $L=L_1=L_2=0.5$ m, i.e. a distance of target 350b to target 360d of 2L=1 m, wherein the calibration uncertainty of the distance of target 360b to target 360d is approximately U=3 µm. The relationship $2L-2L' \leq U$ should apply. From the drawing the relationship $D^2+L'^2=L^2$ is given directly producing $L'/L=\sqrt{(1-D^2/L^2)} \approx 1-D^2/2L^2$, so that the maximum alignment error is given by $D=\sqrt{(2L(L-L'))} \leq \sqrt{(L \cdot U)}$. In the given numerical example $D \leq 1.73$ mm must be maintained over a length of one meter so that the change of the target distance between target 360b and target 360d is at the most equal to the calibration uncertainty. This accuracy can also be achieved reproducibly with holders which can be disassembled. Since the calibration uncertainty and therefore also the maximum alignment error increases proportionally with the length, i.e. both change in a constant relationship to one another, an adequate accuracy can also be achieved even with substantially greater test object and holder dimensions.

Figure 4:
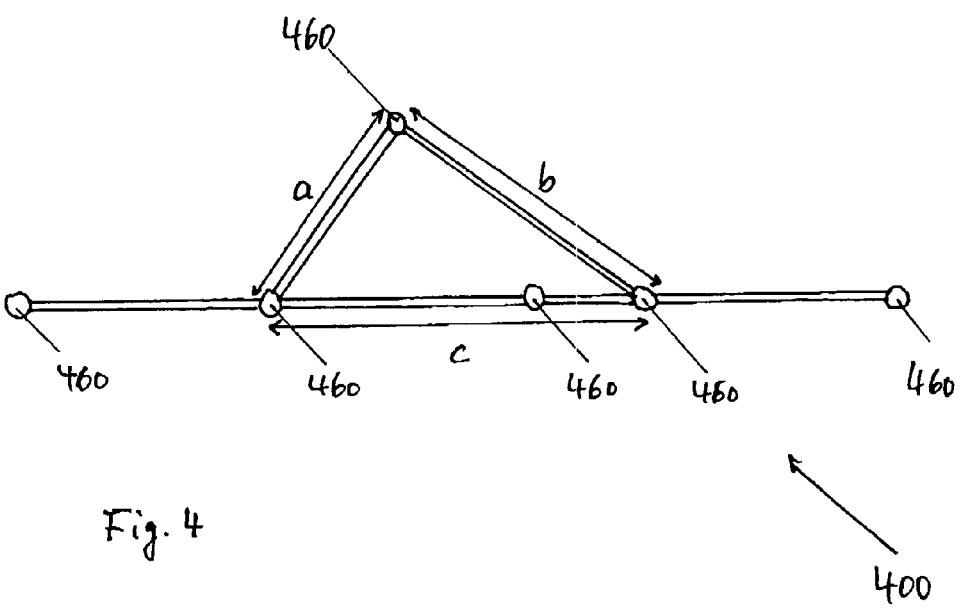
FIG. 4 shows a third embodiment of a test object according to the invention in the form of a ball bar with a branch.

In FIG. 4 a linear ball bar with a branch is shown. Such a branch is unstable with regard to strains about the axis of linear alignment of the ball bar and must therefore be stabilised by a holder according to the invention. Through suitable choice of the respective lengths of the connecting elements, the angle between the connecting straight lines of the targets in the branch triangle can be set differently. For example, with a side ratio of a:b:c of 3:4:5 the angle between a and b is a right angle. This also always applies when $a^2+b^2=c^2$. If also b=c/2, then the angle between a and c is equal to 30° and the angle between b and c is 60°. Depending on requirements, any angular check and in particular a right angle check can be carried out. In the simplest case the ball bar itself can consist of just one connecting element and two targets, whereby the fitting of a branch enables the creation of a triangular test object. Apart from the linear alignment of the ball bar, a branch of a ball bar covers a second direction and further directions can be covered by adding further branches. Through such an arrangement, for example, long measurement volumes with a preferred direction can also be measured three dimensionally with a test object adapted to the requirements.

The invention claimed is:

1. Holder for test objects, which are composed of at least two targets and at least one connecting element comprising
    at least one carrier,
    at least one guide, which is arranged on or/and in the at least one carrier, and
    seats for the targets of at least one test object, wherein at least one seat of said seats is a movable seat that can be moved along the at least one guide such that an adaptation of the position of the at least one movable seat to the position of a target of the test object is possible, whereby the test object can be held by the holder after the adaptation,
    wherein the material from which the at least one carrier is made has a linear thermal coefficient of expansion in the range of $\alpha=0\pm10$ µm/° C.m.

2. Holder according to claim 1, comprising further movable seats for further targets of the at least one test object.

3. Holder according to claim 2, wherein one or more seats are fixedly arranged on the carrier.

4. Holder according to claim 2, wherein at least one seat is equipped such that at least one target of a test object is held by magnetic forces.

5. Holder according to claim 2, wherein at least one test object is a ball bar, and the holder ensures so little alignment error of the linear alignment of the targets that the deviation of the distance of any two targets of a ball bar from the corresponding distance of the geometrically exact alignment is lower than the calibration uncertainty 1.5 µm+1.5 µm·L/m, wherein L is the distance between two targets.

6. Holder according to claim 2, wherein the at least one carrier consists of single elements and these single elements are held together by at least one releasable connection such that reproducibility of the holder is ensured, in particular such that the accuracy of the distances of the targets of a held test object after each assembly of the holder is better than the calibration uncertainty 1.5 µm+1.5 µm·L/m, wherein L is the distance between two targets.

7. Holder according to claim 1, wherein one or more of said seats are fixedly arranged on the carrier.

8. Holder according to claim 1, wherein the material of which the at least one carrier is composed is CFRP material.

9. Holder according to claim 1, wherein at least one seat is equipped such that at least one target of a test object is held by magnetic forces.

10. Holder according to claim 1, wherein at least one test object is a ball bar, and the holder ensures so little alignment error of the linear alignment of the targets that the deviation of the distance of any two targets of a ball bar from the corresponding distance of the geometrically exact alignment is lower than the calibration uncertainty 1.5 µm+1.5 µm·L/m, wherein L is the distance between two targets.

11. Holder according to claim 1, wherein the at least one carrier consists of single elements and these single elements are held together by at least one releasable connection such that reproducibility of the holder is ensured, in particular such that the accuracy of the distances of the targets of a held test object after each assembly of the holder is better than the calibration uncertainty 1.6 µm+1.5 µm·L/m, wherein L is the distance between two targets.

12. Holder according to claim 1, wherein the positions of the targets of a held test object, on account of suitable materials and suitable geometries of the constituent parts of the holder, due to physical ambient conditions varying within the scope of the standard measurement conditions or/and due to mechanical effects with proper use of the holder and its constituent parts vary at the most within the calibration uncertainty 1.5 µm+1.5 µm·L/m, wherein L is the distance between two targets.

13. Holder according to claim 1, wherein the combination of the seats exhibits at least one degree of directional freedom such that the targets and the connecting elements are not subject to any stress.

14. Holder according to claim 1, which furthermore comprises at least one mounting with which the holder can be mounted in the measurement volume.

15. Test device, comprising at least one holder according to claim 1 and at least one test object comprising at least two targets and at least one connecting element, wherein the targets and connecting elements used for the test object can be selected from a given set of single targets and single connecting elements and can be combined to form a test object, and the targets and connecting elements are equipped such that they are held together by magnetic forces, that the test object is adequately stable to be held by the holder and that due to suitable material selection of the targets and the connecting elements, the thermally induced change of the distance of the targets of the test object is maintained within the scope of the measurement tolerances.

16. Holder according to claim 1, wherein the material from which the at least one carrier is made has a linear thermal coefficient of expansion in the range of $\alpha = 0 \pm 1$ µm/° C.m.

17. Test object, comprising at least two targets and at least one connecting element, wherein the targets and connecting elements used for the test object can be selected from a given set of single targets and single connecting elements and can be combined to form a test object, and the targets and connecting elements are equipped such that they are held together by magnetic forces, that the test object is adequately stable to be held by a holder for test objects and that due to suitable material selection of the targets and the connecting elements, the thermally induced change of the distance of the targets of the test object is maintained within the scope of the measurement tolerances, wherein the holder for test objects includes
at least one carrier,
at least one guide, which is arranged on or/and in the at least one carrier, and
seats for the targets of at least one test object, wherein at least one seat of said seats is a movable seat that can be moved along the at least one guide such that an adaptation of the position of the at least one movable seat to the position of a target of the test object is possible, whereby the test object can be held by the holder after the adaptation, and
wherein the test object comprises several targets and several, at least partially of differing length, connecting elements.

18. Holder according to claim 17, wherein the material from which the at least one carrier is made has a linear thermal coefficient of expansion in the range of a $\alpha = 20$ µm/° C.m.

19. Test object according to claim 17 in the form of a ball bar, wherein the targets are formed as balls and the connecting elements as bars.

20. Test object, comprising at least two targets and at least one connecting element, wherein the targets and connecting elements used for the test object can be selected from a given set of single targets and single connecting elements and can be combined to form a test object, and the targets and connecting elements are equipped such that they are held together by magnetic forces, that the test object is adequately stable to be held by a holder for test objects and that due to suitable material selection of the targets and the connecting elements, the thermally induced change of the distance of a targets of the test object is maintained within the scope of the measurement tolerances, wherein the holder for test objects includes
at least one carrier,
at least one guide, which is arranged on or/and in the at least one carrier, and
seats for the targets of at least one test object, wherein at least one seat of said seats is a movable seat that can be moved along the at least one guide such that an adaptation of the position of the at least one movable seat to the position of a target of the test object is possible, whereby the test object can be held by the holder after the adaptation, and
wherein the targets are formed as balls and the connecting elements as bars.

* * * * *